(12) United States Patent
Hegenbart et al.

(10) Patent No.: US 11,808,463 B2
(45) Date of Patent: Nov. 7, 2023

(54) HEATABLE FLOOR PANEL AND FLOOR HEATING SYSTEM FOR AN AIRCRAFT

(71) Applicant: Airbus Operations GmbH, Hamburg (DE)

(72) Inventors: Matthias Hegenbart, Hamburg (DE); Peter Linde, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 615 days.

(21) Appl. No.: 16/359,486

(22) Filed: Mar. 20, 2019

(65) Prior Publication Data
US 2019/0309960 A1    Oct. 10, 2019

(30) Foreign Application Priority Data

Apr. 10, 2018 (DE) .......................... 102018002917.5

(51) Int. Cl.
*F24D 13/02* (2006.01)
*B64C 1/18* (2006.01)

(52) U.S. Cl.
CPC .............. *F24D 13/024* (2013.01); *B64C 1/18* (2013.01); *F24D 13/02* (2013.01); *B32B 2262/106* (2013.01); *B32B 2605/18* (2013.01)

(58) Field of Classification Search
CPC ......... F24D 13/024; F24D 13/02; B64C 1/18; B32B 2262/102; B32B 2605/18; B32B 15/14; B32B 33/00; B32B 2255/02; Y02B 30/00; H05B 2203/003; H05B 2203/026; H05B 3/342; H05B 3/347; H05B 3/145; H05B 3/20
See application file for complete search history.

(56) References Cited

U.S. PATENT DOCUMENTS

| 6,452,138 B1 * | 9/2002 | Kochman | ................ H05B 3/58 219/549 |
| 8,288,693 B2 * | 10/2012 | Weiss | ....................... H05B 3/84 219/541 |

(Continued)

FOREIGN PATENT DOCUMENTS

| CA | 2381592 C | * | 3/2006 | ............. B32B 15/04 |
| CN | 109076647 A | * | 12/2018 | ............. B64D 13/08 |

(Continued)

OTHER PUBLICATIONS

German Search Report; priority document.

*Primary Examiner* — Shawntina T Fuqua
(74) *Attorney, Agent, or Firm* — Greer, Burns & Crain, Ltd.

(57) ABSTRACT

A heatable floor panel for an aircraft, with a supporting level, a heat-generating level and a heat-conducting level. The heat-generating level comprises a fiber composite layer with fibers and with a matrix surrounding the fibers. The fibers are at least partially formed as conducting fiber, and the conducting fibers are formed as carbon fibers with an electrically insulating coating. The conducting fibers integrated in the floor panel in order to conduct a heating current through them. Due to the electrically insulating coating of the conducting fibers, leakage currents are avoided. The carbon fibers serve not only as heating elements, but, at the same time, also as reinforcing fibers of the fiber composite layer or of the floor panel.

10 Claims, 2 Drawing Sheets

(56) References Cited

U.S. PATENT DOCUMENTS

| | | | |
|---|---|---|---|
| 2002/0168184 A1* | 11/2002 | Meisiek | B64C 1/40 |
| | | | 392/435 |
| 2006/0138279 A1 | 6/2006 | Pisarski | |
| 2013/0043342 A1* | 2/2013 | Nordin | H05B 3/145 |
| | | | 244/1 A |
| 2014/0151353 A1* | 6/2014 | Steinwandel | B64D 15/12 |
| | | | 219/202 |
| 2015/0344138 A1 | 12/2015 | Wen et al. | |
| 2018/0015995 A1* | 1/2018 | Linde | B32B 27/08 |
| 2019/0225317 A1* | 7/2019 | Vincitore | H05B 3/28 |
| 2020/0031450 A1* | 1/2020 | Slaton | B64C 1/18 |
| 2020/0164958 A1* | 5/2020 | Müller | B32B 17/02 |
| 2021/0396396 A1* | 12/2021 | Sajic | F24D 19/062 |

FOREIGN PATENT DOCUMENTS

| | | |
|---|---|---|
| DE | 19918736 C2 | 11/2000 |
| DE | 102005058241 B4 | 9/2006 |
| DE | 202012101812 U1 | 7/2012 |
| DE | 102015005945 B3 | 8/2016 |
| EP | 3419381 A2 | 12/2018 |
| WO | 9515670 A1 | 6/1995 |
| WO | 2012159608 A2 | 11/2012 |

\* cited by examiner

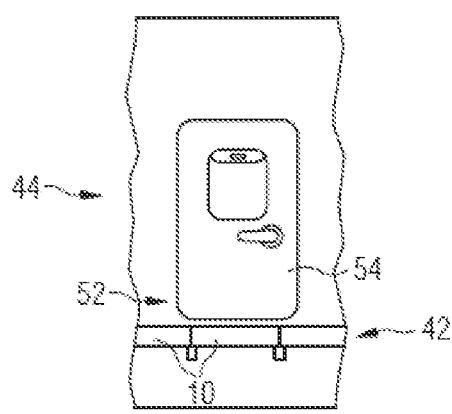
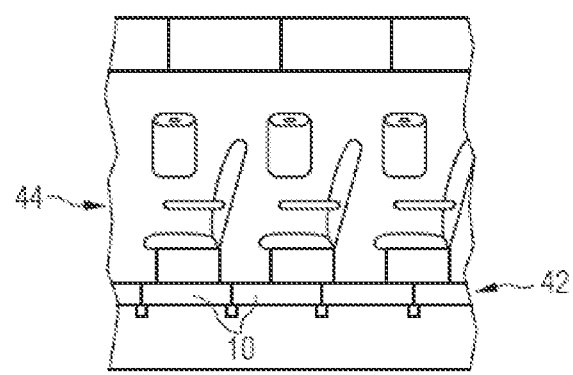
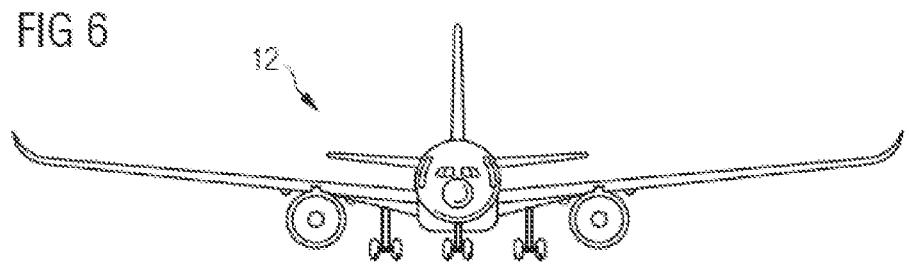

HEATABLE FLOOR PANEL AND FLOOR HEATING SYSTEM FOR AN AIRCRAFT

CROSS-REFERENCES TO RELATED APPLICATIONS

This application claims the benefit of the German patent application No. 10 2018 002 917.5 filed on Apr. 10, 2018, the entire disclosures of which are incorporated herein by way of reference.

FIELD OF THE INVENTION

The invention relates to heatable floor panel for an aircraft and also to a floor heating system for the cabin floor of an aircraft cabin.

BACKGROUND OF THE INVENTION

In the case of commercially used aircraft, an appropriate temperature distribution in the aircraft cabin is important for the comfort of the passengers, pilots and crew. Due to the comparatively direct contact between the floor and the structure of an aircraft, there may, in principle, be an undesired heat loss from the cabin space to the outer skin. At low ambient temperatures, such as are encountered at the usual flying altitude of commercial aircraft or even on the ground in cold weather, this heat loss has the consequence that the floor in the aircraft may cool down. Intensified cooling down may occur, in particular, in the regions near the aircraft doors, since the aircraft doors are typically opened when the aircraft is on ground.

In order to prevent undesired cooling, it is known to heat the floor by means of electrical heating mats. These may also be provided in the region of the aircraft doors.

It is an object of the present invention to provide an improved solution for heating the floor of an aircraft, in particular in the region of the aircraft doors.

SUMMARY OF THE INVENTION

An object of the invention is achieved by a heatable floor panel for an aircraft, with a supporting level, a heat-generating level, and a heat-conducting level, the heat-generating level comprising a fiber composite layer with fibers and with a matrix surrounding the fibers, the fibers being at least partially formed as conducting fibers, and the conducting fibers being formed as carbon fibers with an electrically insulating coating. An idea on which the present invention is based is to use coated carbon fibers as electrical conductors for a heatable floor panel or for a floor heating system. According to the invention, the conducting fibers are integrated in the floor panel, it being possible for a power source to be applied to the ends of the fibers in order to conduct a heating current through them. Due to the electrically insulating coating of the conducting fibers, leakage currents or similar effects can be completely avoided, since the insulated fibers can by all means touch without a leakage current occurring. Such coatings of carbon fibers can be produced with a very high temperature resistance of up to over 700 degrees Celsius even in mass production relatively inexpensively and time-efficiently. A further advantage of the invention is obtained because the carbon fibers of the conducting fibers can serve directly as reinforcing fibers of the fiber composite layer and to a certain extent form a natural component part of the fiber composite layer without discontinuities or electrochemical reactions occurring. The electrically insulating coating can furthermore be selected in such a way that there are no impairments of the bonding behavior, i.e., the conducting fibers have a bonding behavior similar to uncoated carbon fibers.

In principle, the conducting fibers can be processed and treated in the production of the fiber composite in just the same way as uncoated carbon fibers that are usually used. In addition, the conducting fibers can even act directly as reinforcing fibers of the fiber composite component.

Not all of the fibers of the floor panel according to the invention have to be formed as conducting fibers, that is to say, as carbon fibers with an electrically insulating coating. It may also be the case that only a certain proportion of the fibers in the fiber composite layer are formed as conducting fibers and another proportion of the fibers are formed conventionally, that is to say, for example, as fibers that are not flowed through by current (i.e., without an insulating coating and/or in the form of a not electrically conducting glass fiber). The conducting fibers according to the invention are generally massive or solid fibers (that is to say, with a conducting cross section right through). In principle, however, conducting fibers according to the invention that have a cavity along their longitudinal fiber direction (hollow fibers) are also conceivable.

The supporting level of the floor panel according to the invention may, for example, comprise a layer with a honeycomb structure. Such honeycomb structures substantially give the aircraft floor panel its structural strength. It goes without saying that, in addition to such a honeycomb structure, further fiber composite structures may also be provided, such as one or more further fiber composite layers (for example prepregs, etc.) on one or both sides of the honeycomb structure, in order to provide the supporting level with additional strength.

The heat generated in the heat-generating level is evenly distributed by the heat-conducting level. The heat-conducting level is typically arranged on the floor panel on the cabin side (or on top) and consequently also has the function of resisting the effects produced by floor traffic. Generally, the heat-conducting level is arranged over (above) the heat-generating level and the heat-generating level is arranged over the supporting level.

The floor panel according to the invention may, for example, be produced by a method with the following steps: arranging the supporting level, the heat-generating level and the heat-conducting level one on top of the other, and jointly curing the levels, so that a composite floor panel is formed. According to the invention, the carbon fibers of the conducting fibers act not only as heating elements but at the same time also as reinforcing elements of the fiber composite layer.

In the case of a preferred embodiment, the conducting fibers form one or more closed electrical circuits. Consequently, in an advantageous way according to the invention, a heating current can be conducted through the conducting fibers. Leakage currents are avoided by the electrically insulating coating. The insulated fibers can by all means touch without a short-circuit occurring.

Also preferred is an embodiment in which the form of the arrangement of the conducting fibers in the fiber composite layer is selected from the group: individual fibers, fiber bundles, fiber tapes, laid fiber scrims, fiber mats, woven and nonwoven fiber fabrics. The conducting fibers, according to the invention, may be arranged or integrated in different variants. The heating function, according to the invention, of the conducting fibers is, in principle, retained and advantageously retained independently of the form of arrangement of the conducting fibers.

Preferably, the electrically insulating coating has a thickness in the range from 0.1 micrometer to 1 micrometer. In particular, the electrically insulating coating may have a thickness of 0.5 micrometer. The electrically insulating coating completely surrounds the carbon fibers of the conducting fibers. In other words: the electrically insulating coating is provided on the carbon fibers. The carbon fibers may, for example, have a diameter of between 6 and 7 micrometers, so that a diameter of the conducting fibers of approximately 7 to 8 micrometers is obtained.

In the case of a likewise preferred embodiment, the conducting fibers are integrated in the fiber composite layer in such a way that the conducting fibers protrude out of the fiber composite layer, at least at the ends. The fact that the conducting fibers project beyond the fiber composite layer at the ends, that is to say, at their respective ends, means that a power source can be easily connected to the ends.

Also preferred is an embodiment in which the electrically insulating coating is formed as a polymer electrolyte coating. The coating may, in particular, be formed as a solid polymer electrolyte coating. For example, the polymer electrolyte coating may contain a methoxy polyethyleneglycol monomethacrylate. Such polymer electrolyte coatings can have a temperature resistance of at least 700 degrees Celsius, but at the same time offer outstanding binding properties for integration in fiber-reinforced components, for example in a carbon-fiber-reinforced thermoplastic.

Likewise, preferred is an embodiment of the heatable floor panel in which the heat-conducting level is at least partially formed from titanium or a titanium alloy. Such heat-conducting levels or layers that are part of such heat-conducting levels advantageously have a high thermal conductivity and, at the same time, strength in order to withstand the floor traffic in an aircraft cabin. Other metals are not ruled out. The heat-conducting levels of titanium or of a titanium alloy may be adhesively attached, for example by means of an adhesive substance, to the heat-generating level, in particular, to the fiber composite layer.

An object of the invention is also achieved by a floor heating system for the cabin floor of an aircraft cabin, with a floor panel according to the invention and with a power source for providing electrical heating power, the power source being electrically connected to the floor panel, in particular, to the closed electrical circuit or circuits. The floor heating system according to the invention substantially makes use of the same advantages as the heatable floor panel according to the invention.

In the case of a preferred embodiment of the floor heating system, the floor heating system also has a control unit comprising temperature sensors, by means of which the heating power of the power source can be controlled. In this way, the current conducted through the conducting fibers can be constantly adapted if there is any deviation from a specified or desired setpoint temperature locally within or throughout the aircraft cabin.

Finally, a further embodiment of the floor heating system in which the floor panel is arranged in the bottom region of an aircraft door is preferred. In this way, the regions of the aircraft doors that are particularly affected by local cooling down can be specifically heated, and consequently the comfort of the passengers and crew can be improved.

The aspects described above and further aspects, features and advantages of the invention can likewise be taken from the examples of the embodiment, which is described below with reference to the accompanying drawings.

BRIEF DESCRIPTION OF THE DRAWINGS

In the figures, the same reference signs are used for elements, components or aspects that are the same or at least similar. It is noted that there follows a detailed description of an embodiment that is merely illustrative and not restrictive. In the claims, the word "comprising" or "having" does not exclude other elements and the indefinite article "a" or "an" does not exclude more than one. The fact alone that certain features are mentioned in various dependent claims does not restrict the subject matter of the invention. Combinations of these features can also be advantageously used. The reference signs in the claims are not intended to restrict the scope of the claims. The figures are not to be understood as true to scale but are only of a schematic and illustrative character. In the figures FIG. 4 shows a longitudinal section through a portion of an aircraft fuselage in the region of an aircraft door, FIG. 5 shows a longitudinal section through a portion of an aircraft fuselage in the region of the aircraft cabin, and FIG. 6 shows an aircraft with a floor panel according to the invention or a floor heating system according to the invention.

DETAILED DESCRIPTION OF THE PREFERRED EMBODIMENTS

Figure 1:
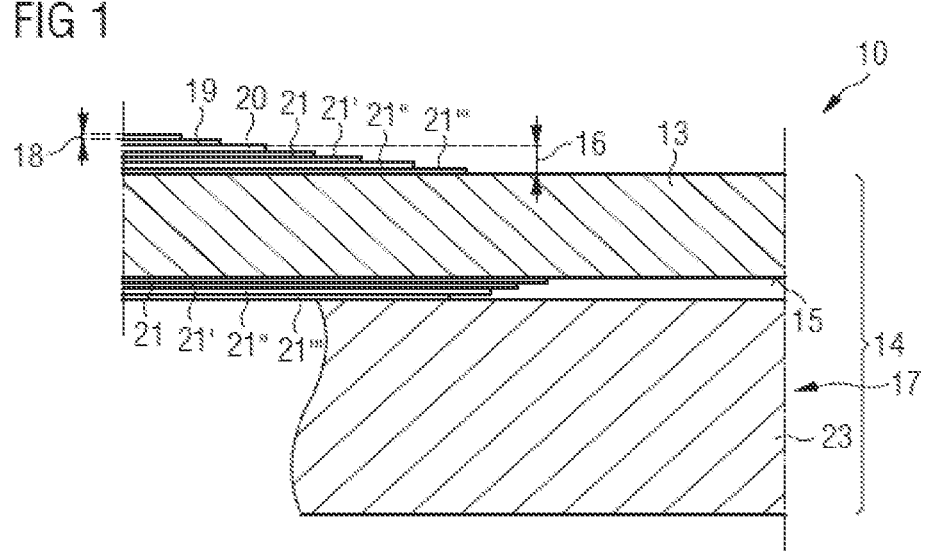
FIG. 1 shows a cross section through a heatable floor panel according to the invention.

FIG. 1 shows a heatable floor panel 10 for an aircraft 12. The floor panel 10 comprises a supporting level 14, a heat-generating level 16 and a heat-conducting level 18.

The heat-generating level 16 in this case comprises at least one fiber composite layer 20, which for its part comprises fibers and a matrix surrounding the fibers (not represented any more specifically). The heat-generating level 16 may also have in addition to the at least one fiber composite layer 20 further fiber composite layers 21, 21', 21", 21"'. These further fiber composite layers 21, 21', 21", 21"' may be, for example, conventional glass-fiber-reinforced or carbon-fiber-reinforced plastics (GRP or CRP).

Figure 2:
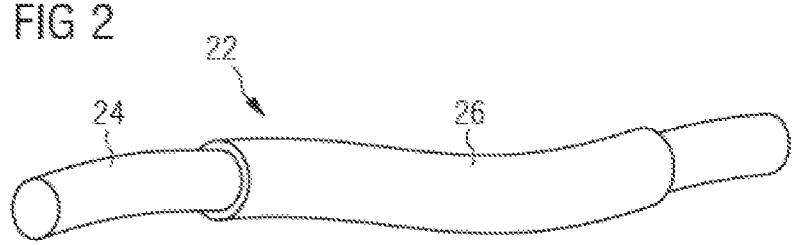
FIG. 2 shows a perspective view of a conducting fiber according to the invention.

As a difference from this, the fibers in the at least one fiber composite layer 20 are at least partially formed as conducting fibers 22 (cf. FIG. 2). For this purpose, the conducting fibers 22 are formed as carbon fibers 24 with an electrically insulating coating 26. The conducting fibers 22 may be used as electrical conductors, and consequently as electrical heating elements for heating the floor panel 10. The conducting fibers 22 are, in this case, integrated in the floor panel 10, allowing a power source 46 (cf. FIG. 3) to be applied to the conducting fibers 22, in order to conduct a heating current through them. Leakage currents are avoided due to the electrically insulating coating 26 of the conducting fibers 22. The conducting fibers 22 may touch and, in this case, serve not only as current conductors, but at the same time also as reinforcing fibers of the fiber composite layer 20.

The heat-conducting level 18 is at least partially formed from titanium and applied to the heat-generating level 16 by means of an adhesive layer 19. Heat-conducting levels 18 of titanium exhibit an advantageously effective and spatially homogeneously distributed heat conduction or heat distribution.

The supporting level 14 comprises a honeycomb structure 13 and multi-ply fiber composite layers 21, 21', 21", 21''' arranged on the underside 15 of the honeycomb structure 13. Finally, the supporting level 14 has, in a lower region 17, a thermal insulation 23. The thermal insulation 23 may, for example, be formed from a foam material with a low thermal conductivity. The thermal insulation 23 has the effect that the floor panel 10 is almost completely thermally isolated from a structure bearing the floor.

The electrically insulating coating 26 represented in FIG. 2 may have a thickness in the range from 0.1 micrometer to 1 micrometer. The carbon fibers 24 may, for example, have a diameter of between 6 and 7 micrometers, so that a diameter of the conducting fibers 22 of approximately 7 to 8 micrometers is obtained. The electrically insulating coating 26 is, for example, formed as a polymer electrolyte coating. Such polymer electrolyte coatings may have a temperature resistance of at least 700 degrees Celsius, but at the same time offer outstanding binding properties for integration in fiber-reinforced components.

Figure 3:
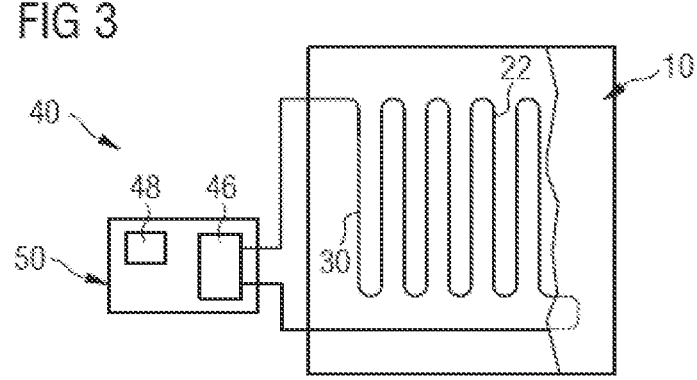
FIG. 3 shows a plan view of a floor heating system according to the invention with a floor panel.

FIG. 3 shows a floor heating system 40 for the cabin floor 42 of an aircraft cabin 44 (cf. FIGS. 4 and 5). The floor heating system 40 comprises a floor panel 10 and a power source 46 for providing electrical heating power. The power source 46 is connected in an electrically conducting manner to the floor panel 10. The floor heating system 40 also has a control unit 50 with temperature sensors 48, by which the heating power of the power source 46 can be controlled. The control unit 50 allows the current that is electrically conducted in the conducting fibers 22 to be continuously adapted if there is any deviation from a desired setpoint temperature and it is wished to compensate for the deviation.

The conducting fibers 22 are integrated in the fiber composite layer 20 in such a way that the conducting fibers 22 protrude out of the fiber composite layer 20 at the ends and can be electrically connected. The conducting fibers 22 form a closed electrical circuit 30, the power source 46 being connected in an electrically conducting manner to the closed electrical circuit 30.

In FIG. 3, the conducting fibers 22 forming the closed electrical circuit 30 are selected and shown merely by way of example in the form of a meandering and continuous individual fiber in the fiber composite layer 20. Alternatively, the form of the arrangement of the conducting fibers 22 of the fiber composite layer 20 may be selected from the group: fiber bundles, fiber tapes, laid fiber scrims, fiber mats, woven or nonwoven fiber fabrics. In this case, it is then also possible in principle to realize a multiplicity of closed electrical circuits 30 for heating the floor panel 10.

In FIG. 4, the floor panel 10 is arranged in the bottom region 52 of an aircraft door 54, and can consequently advantageously heat the regions of the aircraft cabin 44 that are generally affected particularly by cooling down.

FIG. 5 shows an additional or alternative arrangement of the floor panel 10 in the bottom region 52 of an aircraft cabin space by which the temperature in the aircraft cabin 44 can be indirectly controlled.

In FIG. 6, finally, an aircraft 12 in which a floor panel 10 or a floor heating system 40 is integrated is shown.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heatable floor panel for an aircraft, comprising:
a supporting level, wherein the supporting level comprises a honeycomb layer and a thermal insulation layer disclosed below the honeycomb layer,
a heat-generating level disposed above the supporting layer, and
a heat-conducting level disposed above the heat-generating level such that the heat-generating level is between the supporting level and the heat-conducting level, wherein the heat-conducting level is at least partially formed from titanium or a titanium alloy,
the heat-generating level comprising a fiber composite layer with fibers and with a matrix surrounding the fibers,
the fibers comprising a plurality of conducting fibers and a plurality of non-conducting fibers, and
the conducting fibers each being formed as a carbon fiber with an electrically insulating coating which, within the matrix, completely surrounds the carbon fiber, and the non-conducting fibers each being formed as a carbon fiber.

2. The heatable floor panel according to claim 1, wherein the conducting fibers form one or more closed electrical circuits.

3. The heatable floor panel according to claim 1, wherein a form of an arrangement of the conducting fibers in the fiber composite layer is selected from the group consisting of: individual fibers, fiber bundles, fiber tapes, laid fiber scrims, fiber mats, woven and nonwoven fiber fabrics.

4. The heatable floor panel according to claim 1, wherein the electrically insulating coating has a thickness in a range from 0.1 micrometer to 1 micrometer.

5. The heatable floor panel according to claim 1, wherein the conducting fibers are integrated in the fiber composite layer in such a way that the conducting fibers protrude out of the fiber composite layer, at least at ends of the fibers.

6. The heatable floor panel according to claim 1, wherein the electrically insulating coating is formed as a polymer electrolyte coating.

7. A floor heating system for a cabin floor of an aircraft cabin, comprising:
a floor panel according to claim 1,
a power source configured to provide electrical heating power,
the power source being electrically connected to the floor panel.

8. The floor heating system according to claim 7, wherein the conducting fibers form one or more closed electrical circuits, and the power source is electrically connected to the closed electrical circuit or circuits.

9. The floor heating system according to claim 8, further comprising a control unit comprising temperature sensors, via which the heating power of the power source is controllable.

10. The floor heating system according to claim 8, wherein the floor panel is arranged in a bottom region of an aircraft door.

\* \* \* \* \*